(12) United States Patent
O'Grady et al.

(10) Patent No.: US 12,253,992 B2
(45) Date of Patent: Mar. 18, 2025

(54) COLLABORATIVE INDEXING OF CONTENT-ADDRESSABLE DATA

(71) Applicant: Ava Labs, Inc., New York, NY (US)

(72) Inventors: Patrick Robert O'Grady, Palo Alto, CA (US); Stephen Buttolph, Brooklyn, NY (US)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 18/667,024

(22) Filed: May 17, 2024

(65) Prior Publication Data

US 2024/0386006 A1   Nov. 21, 2024

Related U.S. Application Data

(60) Provisional application No. 63/502,850, filed on May 17, 2023.

(51) Int. Cl.

| | |
|---|---|
| *G06F 16/00* | (2019.01) |
| *G06F 16/21* | (2019.01) |
| *G06F 16/22* | (2019.01) |
| *G06F 16/9032* | (2019.01) |
| *G06F 16/9535* | (2019.01) |
| *H04L 9/00* | (2022.01) |
| *G06F 16/50* | (2019.01) |
| *G06F 16/60* | (2019.01) |
| *G06F 16/70* | (2019.01) |
| *G06F 30/27* | (2020.01) |

(52) U.S. Cl.
CPC ........ *G06F 16/2255* (2019.01); *G06F 16/212* (2019.01); *G06F 16/90324* (2019.01); *G06F 16/9535* (2019.01); *H04L 9/50* (2022.05); *G06F 16/50* (2019.01); *G06F 16/60* (2019.01); *G06F 16/70* (2019.01); *G06F 30/27* (2020.01)

(58) Field of Classification Search
CPC .... G06F 16/212; G06F 16/2255; G06F 16/50; G06F 16/60; G06F 16/70; G06F 16/90324; G06F 16/9535; G06F 30/27; H04L 9/50
See application file for complete search history.

(56) References Cited

U.S. PATENT DOCUMENTS

2019/0318348 A1   10/2019   Brenner et al.
2020/0133939 A1    4/2020   Qiu et al.
(Continued)

OTHER PUBLICATIONS

International Search Report and Written Opinion for International Patent App. No. PCT/US24/29955, mailed Aug. 20, 2024 (14 pages).

*Primary Examiner* — Diedra McQuitery
(74) *Attorney, Agent, or Firm* — McDermott Will & Emery LLP

(57) ABSTRACT

Various aspects of the subject technology relate to systems, methods, and machine-readable media for managing and indexing content in a blockchain platform. Various aspects may include receiving, at the blockchain platform, content-addressable data. Aspects may also include indexing the content-addressable data. Aspects may also include generating and serving a recommendation including the content-addressable data for one or more users based on user preferences. Aspects may also include receiving an interaction from the one or more users based on the recommendation. Aspects may include updating a state of a blockchain on the blockchain platform based on the interaction.

20 Claims, 5 Drawing Sheets

(56) References Cited

U.S. PATENT DOCUMENTS

| | | |
|---|---|---|
| 2021/0271634 A1 | 9/2021 | Tian |
| 2021/0357447 A1 | 11/2021 | McKenzie |
| 2022/0198554 A1* | 6/2022 | Filter ................... G06Q 40/00 |
| 2023/0281583 A1* | 9/2023 | Jakobsson ............ H04L 67/306 |
| | | 705/67 |
| 2023/0298008 A1* | 9/2023 | Sarin ....................... H04L 9/50 |
| | | 705/69 |
| 2024/0257255 A1* | 8/2024 | Gupta ................... G06Q 40/06 |

* cited by examiner

COLLABORATIVE INDEXING OF CONTENT-ADDRESSABLE DATA

CROSS-REFERENCE TO RELATED APPLICATIONS

The present disclosure is related and claims priority under 35 U.S.C. § 119 (e), to U.S. Provisional Patent Application No. 63/502,850, entitled DATA INDEXING VM FOR A HYPER-CHAIN FRAMEWORK, to Patrick Robert O'Grady et al., filed on May 17, 2023, the contents of which are hereby incorporated by reference in their entirety, for all purposes.

TECHNICAL FIELD

The present disclosure generally relates to indexing content-addressable data. More specifically, the present disclosure relates to building complex on-chain mechanisms dedicated to increasing the usefulness of the content-addressable data, enabling anyone to index the data by providing useful annotations (e.g., ratings, abuse reports, etc.) on the data.

BACKGROUND

Traditionally, when browsing the web, users are directed to location-based addresses such as IP addresses, URLs, or file paths that are owned and controlled by a central entity (e.g., a web server). When querying these location-based addresses, users must fully rely on the entity to provide accurate and authentic data. This location-based approach makes it difficult to easily combine or compose information from disparate sources across the web. Content-addressable data is used to enable open and decentralized access to content.

With content-addressable data, static data is uploaded to an open, distributed data source (e.g., InterPlanetary File System (IPFS)). Applications can then access this data using content-based addressing, where the data is identified and retrieved based on its cryptographic hash or content address. This content-based approach assures users that the data they are accessing is authentic and further enables decentralized data storage/retrieval as the data can be accessed from any node in the network that has a copy. With a growing push within Internet based services such as web3 to utilize content-addressable data, there is a need for improving the usefulness, functionality, and integrity of content-addressable data on the web.

BRIEF SUMMARY

The subject disclosure provides for systems and methods for managing and indexing content-addressable data in blockchains. According to embodiments, a computer-implemented method for managing content in blockchains is provided. The method includes receiving, on a blockchain platform, content-addressable data. The method also includes indexing the content-addressable data. The method also includes generating a recommendation including the content-addressable data for one or more users based on user preferences. The method also includes receiving an interaction from the one or more users based on the recommendation. The method also includes updating a state of a blockchain on the blockchain platform based on the interaction.

According to embodiments, a system is provided including a processor and a memory comprising instructions stored thereon, which when executed by the processor, cause the processor to perform a method for managing content in blockchains. The method includes receiving, on a blockchain platform, content-addressable data. The method also includes indexing the content-addressable data. The method also includes generating a recommendation including the content-addressable data for one or more users based on user preferences. The method also includes receiving an interaction from the one or more users based on the recommendation. The method also includes updating a state of a blockchain on the blockchain platform based on the interaction and persisting data from the interaction to the state of the blockchain.

According to embodiments, a non-transitory computer-readable storage medium is provided including instructions (e.g., stored sequences of instructions) that, when executed by a processor, cause the processor to perform a method for managing content in blockchains. The method includes receiving, on a blockchain platform, content-addressable data. The method also includes indexing the content-addressable data in a virtual machine of the blockchain platform. The method also includes serving a recommendation for the content-addressable data to one or more users based on user preferences. The method also includes receiving an interaction from the one or more users based on the recommendation. The method also includes updating a state of a blockchain on the blockchain platform based on the interaction and persisting data from the interaction to the state of the blockchain.

These and other embodiments will become clear to one of ordinary skill in the art, in view of the following.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
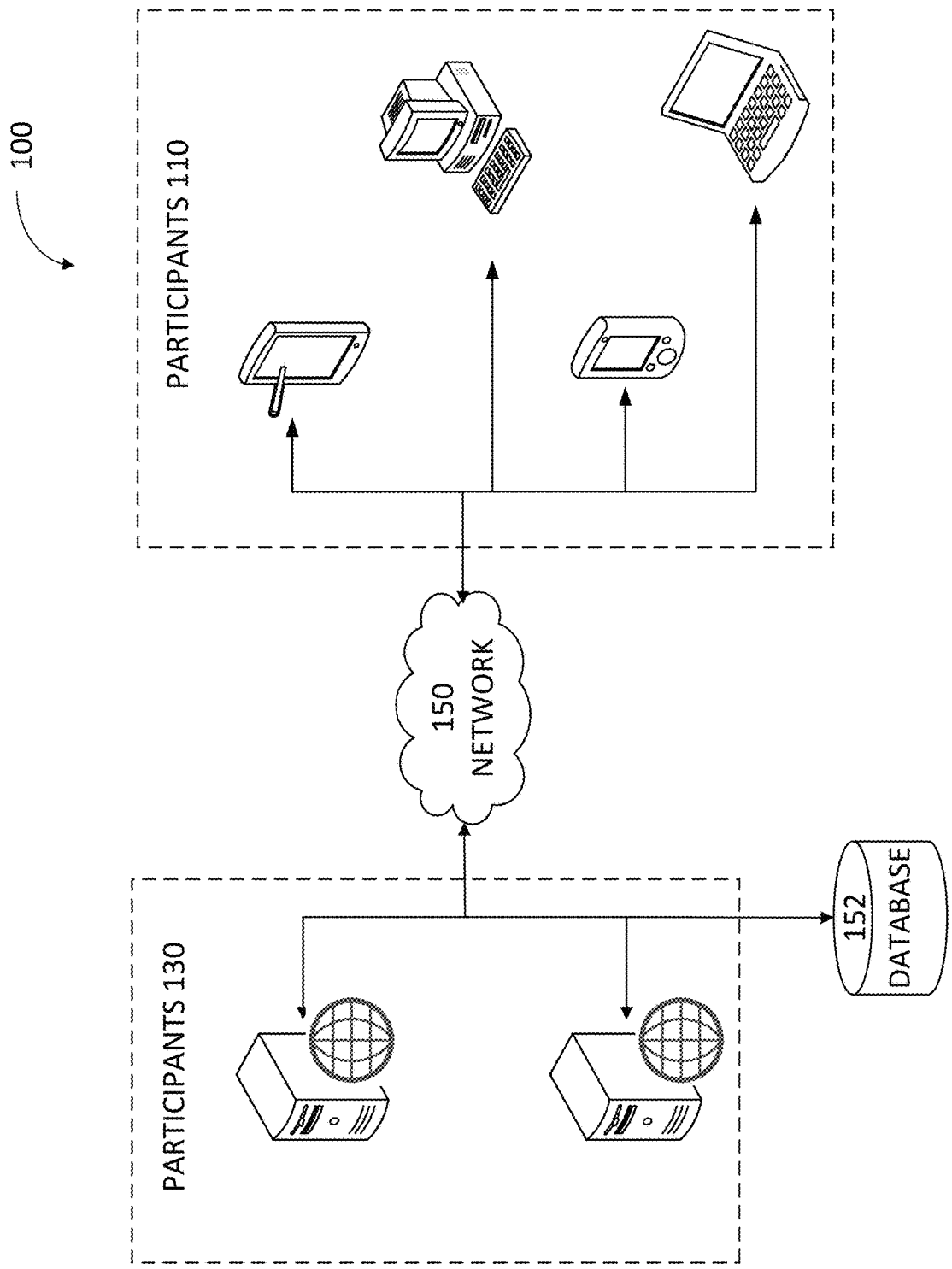
FIG. 1 illustrates an exemplary blockchain platform architecture to provide a blockchain platform which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

General Overview

Traditionally, when browsing the web, users are directed to location-based addresses such as IP addresses, URLs, or file paths that are owned and controlled by a central entity (e.g., a web server). When querying these location-based addresses, users must fully rely on the entity to provide accurate and authentic data. This location-based approach requires unverifiable trust in the entity and makes it difficult to combine or compose information from disparate sources across the web. Further, if location-based addresses like URLs are not handled properly, access may be granted to restricted content or two URLs that route to identical content may be seen as two distinct URLs. Content-addressable data is used to enable open and decentralized access to content and enable authentic content referencing by relating content to unique hashes.

With content-addressable data, static data is uploaded to an open, distributed data source (e.g., InterPlanetary File System (IPFS)). Applications can then access this data using content-based addressing, where the data is identified and retrieved based on its cryptographic hash or content address. This content-based approach enables a decentralized model where the data can be accessed and interacted with by any node in the network. Content-addressable data also allows other users to annotate the content with additional information, further enhancing the value and utility of the data (e.g., ratings, abuse reports, etc.). The annotations are stored in a way that binds them immutably to the content address. This means the annotations cannot be altered or removed, even as the underlying content is accessed from different locations. Other users and applications can then access the annotated content by querying the content address. While the ability to annotate content-addressable data enables users to build upon and enrich the available information, there are potential challenges that need to be considered. Without proper mechanisms in place, users could potentially annotate or upload large volumes of data without regard for quality or relevance. For example, users could add meaningless or even harmful annotations across the content-addressable data ecosystem, impersonate/copy other user's uploads without accrediting the first creator/discoverer, etc.

Embodiments as disclosed herein provide a solution to the above-mentioned problems rooted in computer technology, namely, indexing data and leveraging blockchain technology to enhance the overall utility and value of content-addressable data on the decentralized web. Content-addressable data may include media content, tokens (e.g., non-fungible tokes (NFTs)), or any other assets on the blockchain. Blockchains may be used to manage and track a deterministic ordering of when the data was accessed and annotated, who created and/or discovered the data, who shared or referenced the data, storing balances based on interactions with data, etc. The disclosed subject technology improves the functioning of the computer itself by providing a trackable annotation and recommendation service (e.g., using virtual machines (VMs)), making it easy for anyone to generate world-class recommendations for anyone on the internet based on the annotations to content-addressable data, without having a real, trusted third-party intermediary. According to some embodiments, content is ingested and indexed in a VM. The VM may be implemented on any blockchain or customized blockchain infrastructure.

According to embodiments, the VM enables users to process interactions with the data including, but not limited to, uploading content, referencing other user content, and rewarding referenced users for their contribution. All the interactions on the VM are recorded on a blockchain, resulting in a transparent data feed that allows for the work and expertise provided by individuals involved in the data annotation, distribution, recommendation, or the like. Using the blockchains ensures that contributors can easily be attributed credit for their uploads, ratings, annotations, or contributions to content. It also opens participation to all user in a secure, indisputable environment, including between participants that do not trust each other. By utilizing content-addressable data, users can access data from any (untrusted or trusted) source based on a hash associated with expected content, enhancing the overall decentralization of the ecosystem. By non-limiting example, if a user is expecting a specific hash value and receives data with a different hash value, they can simply reject/drop the data.

According to embodiments, the transparent data feed generated by the interactions on the VM may be used by any third party (or user) to build recommendations, for example, via a recommendation service that curates content recommendations for users based on their previous interactions/annotations or interactions with similar content. The recommendation service may be coupled with the VM and/or a blockchain platform. The content recommendations may be based on any data that is publicly owned or publicly accessible and all previous interactions across all services. The recommendation service may implement artificial intelligence/machine learning (AI/ML)-based models to provide recommendations to users.

According to embodiments, leveraging blockchain technology to create and track content usage also provides a seamless way for users to pay fees, receive rewards, and prevent denial-of-service (DoS) attacks. The blockchain implementation also provides verifiable originality, allowing people to agree on the ordering of annotations more broadly such as when and by who data is accessed and/or annotated. Having a deterministic, globally agreed upon ordering (which blockchains provide) enforces originality providing a source of verifiable content (e.g., on the web). A reward mechanism may be implemented on the VMs such that users are rewarded for their contributions to the content-addressable data (e.g., annotations, discovery, creation, etc.), encouraging quality content.

By non-limiting example, a searcher may discover, upload, or create new content on the decentralized web. The new content may be iterated over all the other content available in the blockchain platform. The new content is then recorded on chain. The searcher earns a reward whenever the new content is used. Any use or reference of the new content may be recorded on chain. A servicer may recommend data (e.g., the new content) to users of the decentralized web by analyzing historical on-chain data. For example, the servicer may ingest the new content from the searcher and serve it to a randomized set of users (e.g., in a content feed or the like). The users may provide ratings and/or annotations based on the new content (e.g., good content, bad content, explicit content, etc.) discovered by the searcher and recommended by the servicer.

According to embodiments, an AI model(s) of the recommendation service may learn from the ratings and/or annotations of the users and determine user preferences based on any/all users of the blockchain platform. User preferences may be weighted based on one or more parameters (e.g., user reputations, activity levels, context, etc.). The servicers' recommendations may be based on the AI model and weighted user preferences. Maintaining all interactions with the new content on the blockchain enables an open record for any user to ingest, for example, a historical feed of the new content and offer their own recommendations.

In some implementations, any of the participants (e.g., searchers, indexers, servicers, and/or users) may be a single entity. By non-limiting example, a servicer may also search for content and/or provide ratings for content. Similarly, and by non-limiting example, a user may act as searchers and find content on the web and still annotate content. In some implementations, one or more of the participants are different entities. By non-limiting example, the servicer may only provide recommendations to users but not to actually find the content being recommended. This is possible due to the open, on-chain structure of the data according to embodiments.

As used herein, the term "blockchain" generally refers to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block, a timestamp, and transaction data. The state of each block and/or the transaction data may be represented as a Merkle tree root hash.

As used herein, the term "subnet" or "subnetwork" generally refers to a dynamic set of validators working together to achieve consensus on a state of a set of blockchains. For example, each blockchain is validated by exactly one subnet. A subnet can validate arbitrarily many blockchains. A validator node may be a member of arbitrarily many subnets. A subnet may manage its own membership and it may require that its constituent validators have certain properties.

As used herein, the term "primary network" generally refers to a special subnet, which validates built-in blockchains. Members of the subnets may also be a member of the primary network. In some embodiments, a subject that is member of the primary network, stakes (e.g., acquires or "buys") one or more tokens from the primary network. As a result, blockchain validators can validate built-in blockchains on the primary network and have also staked primary network tokens.

As used herein, the term "customized blockchain" may include a VM marketplace having subnets serviced by unique VM modules that allow users to create feature sets directed to specific needs. For example, a gaming application in the VM marketplace will have different VM modules than a finance application.

According to aspects, subnets enable the creation of a heterogeneous network of blockchains that can communicate with each other. In embodiments as disclosed herein, numerous validators supporting different blockchains are able to interact with one another. Accordingly, a system as disclosed herein coordinates subnet interactions by learning the source of truth for the blockchain state (the validator set) and interactions of the blockchain state. In addition, the system incentivizes the subnets to economically sustain the validators.

Although both forks and subnets support a variety of underlying VMs and their participants, a subnet enables interoperability of different types of virtual machines from the main network (e.g., primary network). On the other hand, forks split the network into isolated historical versions of the main network and make it impossible to maintain the code base and communicate with it. Accordingly, in some embodiments, forking is temporal, whereas subnets are spatial.

Embodiments as disclosed herein include subnets to facilitate the operation and management of customized blockchains by cutting down development time from years to only weeks. The subnets also provide performance isolation, such that performance impacts to one of the subnets may not impact other subnets, as long as they are not communicating with one another. Subnets also allow the creator, miner, or administrator (e.g., user) to limit, manage and assign validators.

Example Architecture

FIG. 1 illustrates an exemplary blockchain platform architecture 100 to provide a blockchain platform. Specifically, in this example, the network architecture 100 provides a blockchain platform implementation/deployment platform for content indexing and recommendations. Blockchains in the blockchain platform are validated by (i.e., the state of it is maintained by) a group of nodes (e.g., a subnet). As such, the blockchain platform includes subnets with corresponding validator sets. The blockchain platform architecture 100 includes a shared registry of validators made up of all the subnets' validator sets. The blockchain may be a linear chain of blocks of the same dimension, such as the same height, size, length, etc. Blocks of the blockchain may comprise or store data or organized information (e.g., records of information), including a cryptographic hash of the previous block, a timestamp, and transaction data, for example.

In the example of FIG. 1, the network architecture 100 includes one or more participants 110 and one or more participants 130 which are communicatively coupled through the network 150. The blockchain architecture of the network architecture 100 can be a distributed database that maintains a continuously growing list of ordered records as the blocks. In some embodiments, the blockchain platform architecture 100 may leverage AI/ML models to generate recommendations based on ingested data.

It is understood that the participants 130 may include the participants 110 as well, such that they are peers. As an example, the participants 130 may include a cloud server or a group of cloud servers. In some implementations, the participants 130 may not be cloud-based servers (i.e., may be implemented outside of a cloud computing environment) or may be partially cloud-based. The participants 130 may provide services such as Internet based services including web2 services and web3 services, for example, to the participants 110. For example, the participants 110 may include any one of a laptop computer, a desktop computer, or a mobile device such as a smart phone, a palm device, or a tablet device. As an example, the participants 110 may be clients of the blockchain platform for creating, expanding, or otherwise modifying customized blockchain networks and/ or private or public subnets. As an example, the participants 110 can function as validators. As an example, the participants 110 may be VMs that form nodes of the blockchain platform architecture 100. The participants 110 that function as nodes can run software to verify block and transaction data, store data, validate, respond to network requests for data, and/or the like for the existing blockchain. VMs can be computers that run on blockchain and allow smart contracts from multiple sources to interact with one another. The participants 110 send messages or issue transactions upon request by the participants 130, such as via a module of the participants 130 at a particular time. The messages may be validated by a validator of the blockchain platform.

The network 150 may include a wired network (e.g., via fiber optic or copper wire, telephone lines, and the like) or wireless network (e.g., a cellular network, radio-frequency (RF) network, Wi-Fi, Bluetooth, and the like). The participants 110 may be any one of a mobile device, a laptop, a desktop, a tablet (e.g., palm or pad) device, a television, a display device, and/or the like. The participants 110 can be controlled by users as a set of validator nodes for making decisions in tandem, such as for facilitating operation or design of the blockchain implementations of the blockchain platform. Multiple participants 110 may have access to the blockchain platform hosted by the participants 130 via an online or offline connection, such as a wireless connection, wired connection, ad hoc connection, mobile connection, satellite connection, and/or the like. Each of the participants 130 may be a computing device such as part of a cloud computing server including one or more desktop computers or panels mounted on racks, and/or the like. The panels may include processing boards and also switchboards, routers, and other network devices.

Database 152 may store relevant information regarding, for example, execution, verification logic and/or rules for implementing protocols and recommendation services, contextual information, etc. The participants 130 may store data of the existing blockchain in a peer-to-peer (P2P) and/or distributed ledger fashion in a database 152. In particular, the participants 130 may function in conjunction to autonomously manage the decentralized database(s) of the existing blockchain via the P2P network and a distributed timestamping server of the participants 130. The participants 130 may be configured to implement multiple chains of the blockchain platform architecture 100. For example, the participants 130 can implement a plurality of chains of the blockchain platform architecture 100, such as an asset blockchain (e.g., for creating new assets, asset exchange, cross-subnet transfers), metadata blockchain (e.g., for coordinating validators, tracking active subnets, and creating new subnets), smart contract blockchain (e.g., for creating smart contracts and applications that require total ordering), etc. The plurality of chains or built-in layers of the blockchain can be validated by a primary network of the blockchain platform architecture 100 that comprise all existing subnets. The primary network may also keep the shared registry for all validator sets of the subnets. Each validator is associated with a BLS key, which is also registered on the primary network.

Figure 2:
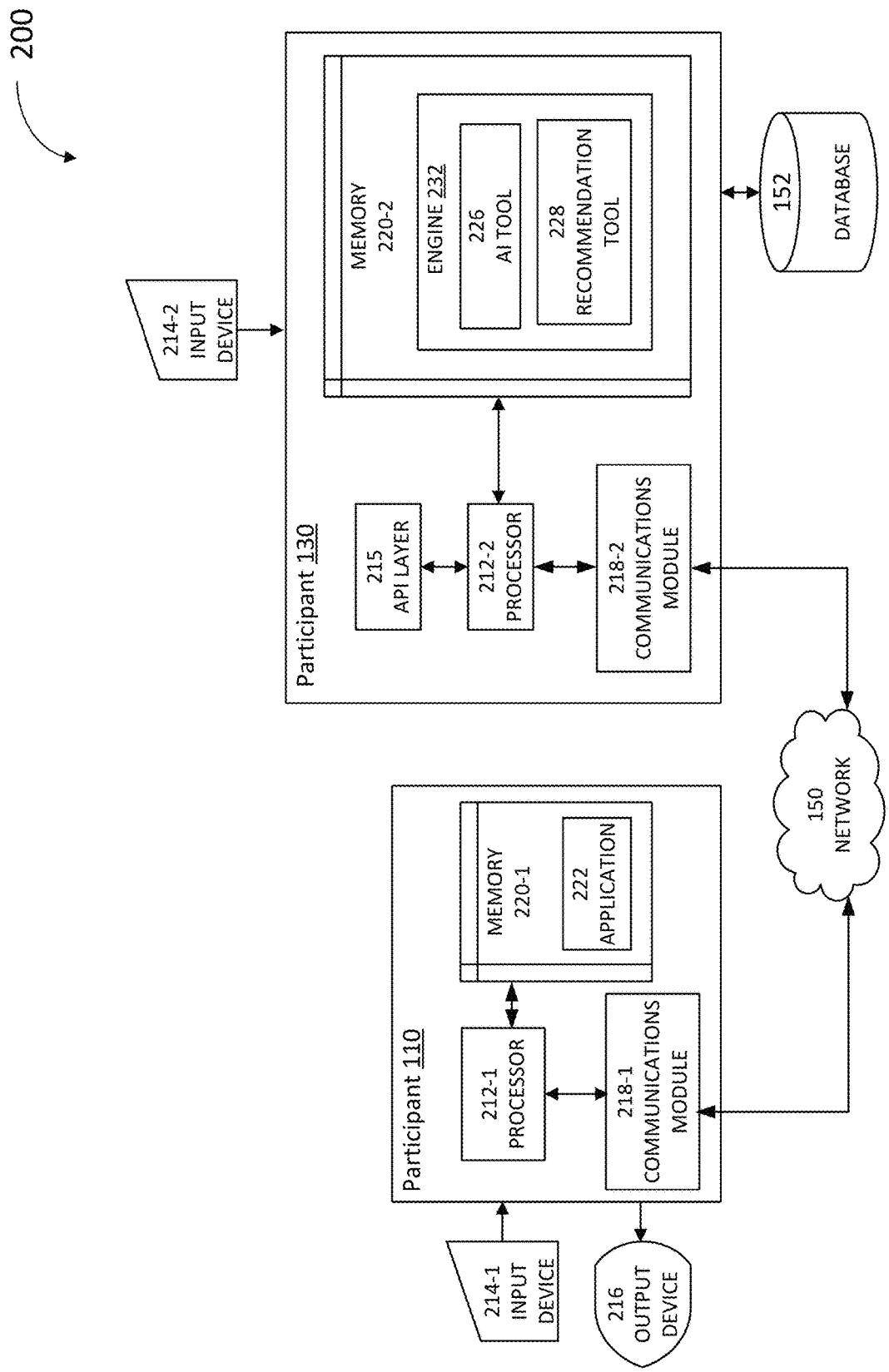
FIG. 2 is a block diagram illustrating details of a system for implementing a blockchain platform, according to certain aspects of the present disclosure.

FIG. 2 is a block diagram illustrating details of a system 200 for implementing a blockchain platform, according to some embodiments. The system 200 may implement interaction tracking for content-addressable data and/or a recommendation service. FIG. 2 illustrates a participant (of one or more participants 110) and a server (of one or more participants 130) of the system 200 for use in the network architecture of FIG. 1, according to some embodiments. The blockchain platform of the example system 200 may include blockchains represented by the one or more participants 110 and a plurality of platform blockchains validated and secured by a primary subnet (e.g., primary network) and may be represented by the one or more participants 130. The blockchains may be validated by a set of validators working together to achieve consensus on the state of a set of blockchains in the blockchain platform.

Each of the one or more participants 110 and the one or more participants 130 may access each other and other devices in the network 150 via corresponding communications modules 218-1-218-2. By non-limiting example, participant 110 may be trying to send a message to participant 130. Participant 130 may reference another participant (not shown). The communications modules 218-1-218-2 may each include radio hardware and software such as RF antennas, analog circuitry, digital to analog conversion circuits, digital signal processing circuitry, and/or the like. The specific participant 110 and participant 130 depicted in FIGS. 1-2 may each include a processor 212-1 and 212-2 and memory 220-1 and-220-2, respectively. Memories 220-1 and 220-2, and processors 212-1 and 212-2, and communications modules 218-1 and 218-2 will be collectively referred to, hereinafter, as "memories 220" and "processors 212" and "communications modules 218." Processor 212-1 of the participant 110 may be used to operate the participant 110, such as to execute applications and functions thereof rendered on the participant 110. In some embodiments, the participants 110, 130 may be operated as a blockchain validator, such as to verify transactions on the existing blockchain. The participant 110 can receive rewards (e.g., cryptocurrency) in exchange for verifying transactions or for participating and staking a network token of the blockchain platform. The participant 110 can be part of a set or list of validators including other validators of the one or more participants 110. Generally, the participant 110 and the participant 130 include computing devices including at least: the memories 220 storing instructions and processors 212 configured to execute the instructions to perform, at least partially, one or more steps as described in methods according to one or more embodiments. For example, memory 220-1 of participant 110 may be used to perform functions associated with the blockchain platform hosted by the participant 130, such as functioning as a validator node or VM to maintain the integrity of the existing blockchain, a relayer, and/or other entity. The participant 110 can be one of a plurality of validators (or nodes) that may be organized into a small list of validators for randomly sampling proposers of the next block added to the existing blockchain. A list of the subnet's validators can be extracted by the participant 130 from a designated blockchain platform chain.

Participant 110 may also include a processor 212-1, configured to execute instructions stored in a memory 220-1, and to cause participant 110 to perform at least some of the steps in methods consistent with the present disclosure. Processor 212-1 of the participant 110 may be used to operate the participant 110, such as to execute applications and functions thereof rendered on the participant 110. Memory 220-1 may further include an application 222. The application 222 may include specific instructions which, when executed by processor 212-1, cause a dataset from participant 130 to be displayed for the user. Settings of the participant 110 can be defined via user/operator input, such as via an input device 214-1. The participant 110 can implement, for example, content indexing and recommendation as described herein based on information stored in the application 222. Data and files (e.g., one or more datasets) associated with the application 222 may be stored in database 152.

The participant 110 may be used by a user of the blockchain platform, such as to perform message transfer, exchange transactions, blockchain validation, block proposal, and other blockchain functions, such as via a graphical user interface (GUI) or display for the user of participant 110. For example, the participant 110 may be coupled to at least one input device 214-1 and output device 216 accessible by the user (e.g., for user input and output perceivable by the user). Input device 214-1 and 214-2 (hereinafter, collectively referred to as "input device 214"), may include a mouse, keyboard, a pointer, a stylus, a touchscreen display, microphone, voice recognition software, GUI, and/or the like. The output device 216 may include a display (e.g., the same touchscreen displays as the input device), a speaker, an alarm, and the like.

Participant 130 includes an application programming interface (API) layer 215, which controls application 222 in each of participant 110. API layer 215 may also provide instructions, procedural information, updates, or the like to participant 110 as, e.g., new features are uploaded in the application 222 (e.g., newly added features or pharmacy notices like closures, etc.). Participant 130 also includes a memory 220-2 storing instructions which, when executed by a processor 212-2, causes participant 130 to perform at least partially one or more operations in methods consistent with the present disclosure.

Memory 220-2 may include an engine 232. The engine 232 may include computing platform(s) comprising modules configured to perform aspects of embodiments (e.g., described with reference to system 300 in FIG. 3). For example, the engine 232 may include instructions to record interactions with content-addressable data as disclosed herein. To do this, the engine 232 may include an AI tool 226 and recommendation tool 228. AI tool 226 may include one or more algorithms trained on, for example, web data, user inputs through application 222, and data extracted through the network 150. Recommendation tool 228 may be configured to generate recommendations based on AI tool 226 and provide the recommendations, for example, via application 222. In some embodiments, engine 232 is configured to access database(s) 152 to retrieve data and archives as inputs for the machine learning model. In some embodiments, engine 232, the tools contained therein, and at least part of database(s) 152 may be hosted in a different server that is accessible by participants 110, 130.

Processor 212-2 may be configured to execute AI tool 226 and recommendation tool 228 by software; hardware; firmware; some combination of software, hardware, and/or firmware; and/or other mechanisms for configuring processing capabilities on processor 212-2. As used herein, the term "tool" may refer to any component or set of components that perform the functionality attributed to one or more aspects of embodiments. This may include one or more physical processors during execution of processor readable instructions, the processor readable instructions, circuitry, hardware, storage media, or any other components.

Although the above description describes certain functions being performed by the processor 212-1 of the participant 110 and other certain functions being performed by the processor 212-2 of the participant 130, all of the functions described herein can be performed by the participant 110 and/or the participant 130 in some other alternative division of labor. That is, the processors 212 could perform more or less of the functions described above. In some embodiments, some or part of the participant 110 can be co-located with the participant 130. That is, the participant 130 can be a remote platform or both the participant 110 and the participant 130 can be part of the same larger computing system, network, or architecture. It is also understood that participant 110 may include AI and recommendation tools in its memory 220-1, and participant 130 may include application information in its memory 220-2, such that they have parallel structures.

Figure 3:
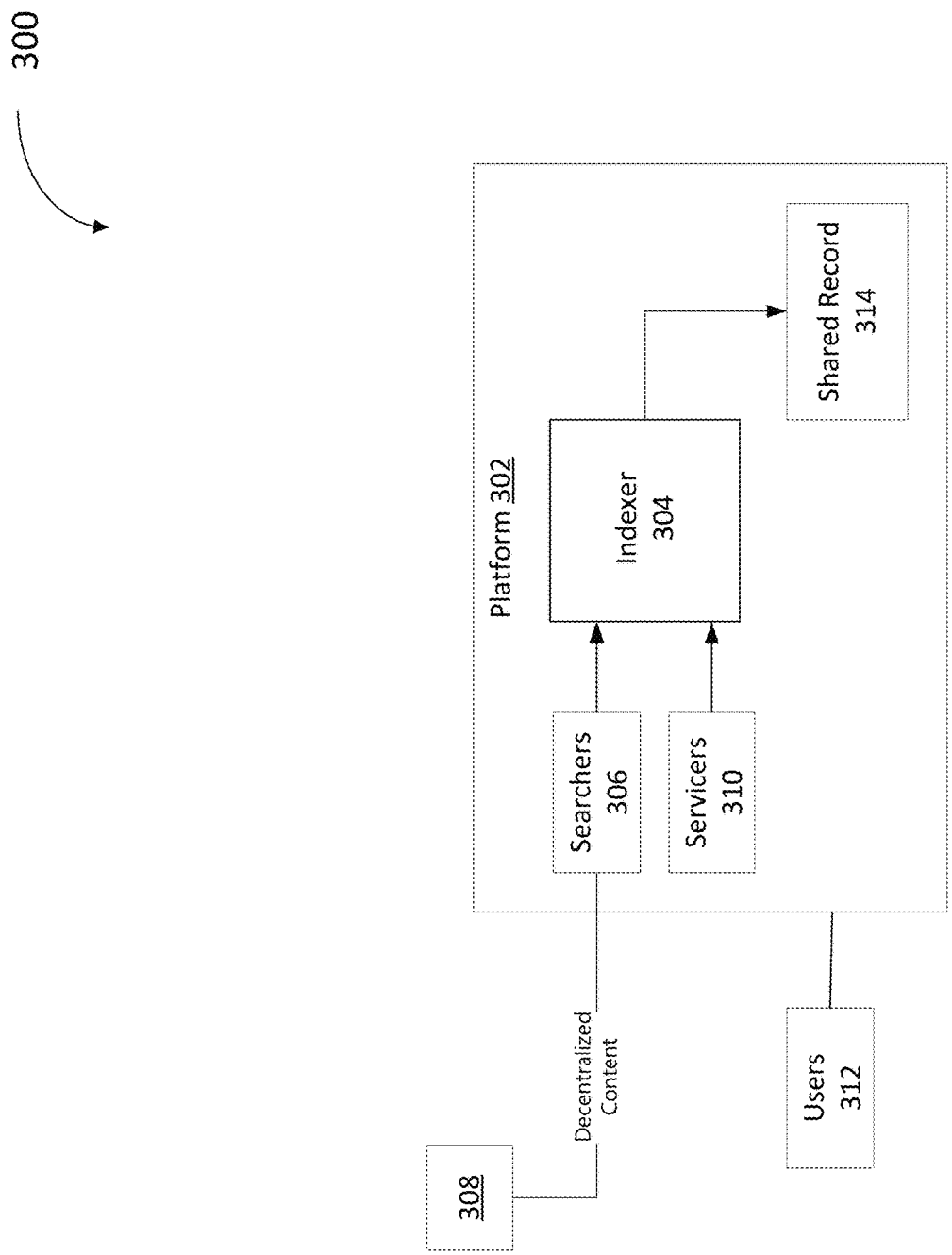
FIG. 3 illustrates an exemplary system for managing and indexing decentralized data in a blockchain platform, according to some embodiments, according to certain aspects of the present disclosure.

FIG. 3 illustrates a system 300 for managing and indexing decentralized data in a platform 302, according to one or more embodiments. The system 300 may be used to implement example applications, including, but not limited to, token searcher, content (e.g., meme, image, etc.) searcher, recommendation server, command-line interface (CLI)-based content views/voters. The platform 302 may correspond to a blockchain network/platform including nodes (e.g., validating nodes and non-validating nodes), one or more blockchains (e.g., shared record 314), and VMs (e.g., indexer 304) specifying a state, state transition function, transactions, and APIs for blockchains. The platform 302 may include subnets and operations described herein may be implemented using subnets or customized blockchains.

As shown in FIG. 3, content-addressable data is ingested by an indexer 304. According to embodiments, the indexer 304 may be an index VM facilitating decentralized annotations over decentralized data using a shared record 314 of truth. The index VM may process content from one or more accounts (e.g., corresponding to a participant of the blockchain network/platform). In some embodiments, the index VM is built on an underlying framework. The index VM, focused on indexing content-addressable data, may inherit the features and performance characteristics of the underlying framework. By non-limiting example, the index 304 may inherit state sync, optimized block execution, nonce-less transactions, and support for generic storage backends, etc.

Searchers 306 may create new content or take content from the decentralized web 308 and/or one or more other sources. By non-limiting example, the searchers 306 may scrape decentralized data included in a data source 308 and uploaded the content to the indexer 304 where they are indexed. The data source 308 may include, for example, web addresses or web applications, user devices or applications with new content, etc. As such, the data is widely accessible on the indexer 304 rather than, for example, stored in a server owned and managed by a central entity). In some implementations, the searchers 306 pin any content that it sources and was indexed to a locally running node. In some embodiments, the searchers 306 skip content where fetching their metadata takes longer than a predetermined amount of time.

According to embodiments, each uploaded content item is assigned a hash. The hash of the content is committed to the shared record 314. For example, the hash may be persisted/committed to a state of the blockchain. Any transactions and/or balances for participants (e.g., searchers, indexers, servicers, and/or users) of the platform 302 using indexer 304 may be stored in the shared record 314. For example, the transactions and/or balances of participants may be stored in the state of a blockchain. The shared record 314 may be used as a mechanism to distribute data to participants with authenticity and integrity. In some embodiments, content-addressable data is maintained for a limited time. By non-limiting example, content uploaded 14 or 7 days ago is deleted by whoever holds it and any actual balances and data indicating originality (i.e., who participant uploaded/created the content) is retained on the shared record 314.

According to embodiments, the searchers 306 earns a reward whenever the new content or uploaded content is used. Any use or reference of the new content may be recorded in the shared record 314. For example, the references may be recorded as transactions on-chain. Servicers 310 may recommend data (e.g., the new content) to users of the decentralized web by analyzing historical on-chain data. For example, a servicer may ingest the new content from a searcher and serve it to a randomized users 312 (e.g., in a content feed or the like) or a set of users. The users 312 may provide ratings and/or annotations based on the new content (e.g., good content, bad content, explicit content, etc.) discovered by the searcher and recommended by the servicer.

According to embodiments, actions may define the purpose of a transaction or how users interact with the shared record 314 runtime. For example, the actions may be user-defined elements of any transaction (or interaction) that is processed by all participants of any chain on a blockchain. In some embodiments, actions may include, but are not limited to, index actions, authorize actions, clear actions, modify actions, transfer actions, and un-index actions. Actions on the blockchain may require authorization. In some embodiments, a signature is used for a given signer as a means of direct authentication. The signer will be the actor in any action they authenticate. In some embodiments, delegate authentication is used to let the signer serve as the actor of some action, if the actor previously authorized them to do so. This makes it possible, for example, for a signer to index data on behalf of another actor and for the actor to then revoke the signer without losing the reputation they built up. For example, this is particularly useful for actors that may use external servers to upload new content and do not want to give the external servers the ability to transfer funds.

Index actions may be used to persist arbitrary content in a state of a blockchain for other participants to ingest and reference. An index action may be a main interaction on the indexer 304. The index action may be used for recording new content (e.g., by searchers 306) and ratings existing content (e.g., by users 312).

In some embodiments, the indexer 304 enables the sender of any transaction (often called the "actor") to lock funds for each item that they add to state. These funds are then unlocked when the state previously added is removed. This lock mechanism properly charges participants for the additional strain their allocation of additional state puts on the rest of the network (e.g., slower block execution, slower state sync, more disk usage, etc.). In some embodiments, not all lock funds may be refunded to an actor when an object is removed from state. Although there are already fees for removing state objects, they may not be enough to discourage a malicious participant from rapidly adding/removing objects to increase block verification time (i.e., target modification of the underlying chain state may be underpriced).

In some embodiments, an authorize action enables any account owner (e.g., the searchers 306) to grant another account owner granular permissions over their account. This is useful when creating server-based searchers that only have the ability to add new content but not transfer funds. In some implementations, the authorize action may be used to rotate an admin key of an account (e.g., give all privileges to a new key and revoke all privileges from a current key). In some embodiments, the clear action transfers all funds in an account to another account and deletes it from the shared record 314 (e.g., deletes it from the state of a blockchain). The state deletion may also refund the other account.

In some embodiments, an modify action may modify royalties that must be paid when referencing content in an index action. By non-limiting example, the searchers may lower the price of old content that is no longer frequently referenced in a bid to capture more revenue. By non-limiting example, servicers 310 may prefer to serve affordable content to users 312 and lower the price accordingly.

In some embodiments, a transfer action may transfer funds to any other account. If the recipient does not exist, a new account may be created, funds locked on the new account, and default permissions assigned to the recipient/user.

In some embodiments, an un-index action may remove a previously uploaded piece of content from state. This is useful when content is no longer referenced by others and a searcher feels that uploading a new piece of content could be more profitable. Locked funds of the previously uploaded content may be used elsewhere.

According to embodiments, the shared record 314 includes enforceable rewards for searching for content as it requires an investment of time, talent, and resources. For example, the searchers 306 are rewarded for discovering content on the decentralized web and uploading it to a deployment of the indexer 304. To reward the searchers 306 for interesting discoveries, the indexer 304 enables searchers 306 to enforce that any content that references content they uploaded must pay the searchers 306 royalties (e.g., an uploader-specified fee). The royalties' incentives the searchers 306 to find and upload good content.

According to embodiments, the indexer 304 may maintain native data linking by specifying a parent that is associated with each index action. The parent may correspond to a first instance of the content associated with the index action. This allows anonymous participants to build on the activity or discoveries of others in a structured manner that allows anyone ingesting the activity feed to recognize without parsing an action's content.

According to embodiments, each uploaded content is given a canonical identifier. According to some embodiments, the indexer 304 may index the uploaded content on-chain in a blockchain (i.e., shared record 314). The canonical identifier may include a respective content and a hash of the parent. According to some embodiments, the searchers 306 may be the owner of the parent in the transaction on the blockchain. By specifying the searcher as the owner, the searchers 306 may be easily fetched during execution of the transaction which updates a state of the blockchain data (e.g., changes to account balances and other data stored on the blockchain).

In some embodiments, the indexer 304 may reject the indexing of identical content by other participants based on the canonical identifier. The canonical ordering in the indexer 304 ensures that a parent (e.g., a first creator or discoverer) is rightfully accredited for their work, ensuring verifiable authenticity, immutable, and traceable content. In some embodiments, indexer 304 bounds arbitrary data storage to a predetermined size that is sufficient for storing references/annotations of data (i.e., transactions/interactions) on other storage mediums. This makes the decentralized data in the indexer 304 more useful and not merely a storage layer for all decentralized data. In some implementations, the indexer 304 offers best-effort storage of large files over a network layer.

According to embodiments, the searchers 306 provide a schema to describe the content when persisting new content to a state (e.g., using index actions). In some implementations, the schema may be user-defined and can be any value. The schema may be associated with an identification (ID). Content may be indexed data that will be associated with the ID. In some implementations, the schema is a hash of a human-readable value. Requiring all index events to specify a schema enables data indexers (e.g., indexer 316) and recommenders (i.e., servicers 310) to filter by relevant content (e.g., content they care about) and to employ custom parsers that can read the arbitrary data. In some embodiments, indexers listen for content adhering to specific schemas and skip content which does not adhere to an expected format. According to embodiments, the schema and the originator of the scheme (e.g., searchers 306) may be stored on-chain.

Servicers 310 serve recommendations for content to users 312 for any schema (or on-chain schema). The users 312 may provide a rating or annotation of the content that they were recommended. The users 312 must be willing to pay a commission for the content in order to interact with it. In some implementations, the servicers 310 may include a recommendation engine configured to serve a limited number of recommendations before requiring users 312 to pay the commission in their ratings. The commission required for each recommendation may be specified by an account or at the shared record 314. In some implementations, the servicers 310 specify a number of pending ratings to allow before previous recommendations are re-served to users. In some implementations, a deposit is required before serving recommendations to avoid DoS. According to embodiments, the users 312 may also be rewarded when participants reference or interact with their ratings/annotations. This reward incentives users 312 to provide meaningful ratings/annotations that may be referenced by any network participants.

The servicers 310 may rely on ingestors that parse data in the shared record 314 and persist it. By non-limiting example, the ingestor may listen to activity on-chain and persist it in the recommendation engine. In some embodiments, a commission (or royalty) may be paid to servicers 310 when logging a rating (instead of needing to send an additional transfer). The commission may be the amount required to reference content as a parent in another index of the indexer 304. For example, the servicers 310 may require some commission per number of recommendations to cover the cost of running their recommendation engine. The commission may be user-level defined, providing increased flexibility. By non-limiting example, the servicers 310 may offer a discount after performing a predetermined number of interactions per month.

According to embodiments, any participant (e.g., searchers, indexers, servicers, and/or users) can view uploaded content. By non-limiting example, participants can interact with content by uploading, rating, saving, and/or referencing the content, enabling an environment with equally weighted peers contributing to content. In some implementations, participants auto-rate content based on participant preferences. Data from the interactions (e.g., balance changes/transfers) may be persisted to the shared record 314 (e.g., a state of the blockchain).

According to embodiments, the recommendation engine may include an AI model trained to learn what the respective participants like and provide better recommendations to those participants and other participants based therefrom. By non-limiting example, users 312 may rate a set of content. Based on the ratings, the AI model may determine user preferences from the ratings of the set of content and provide improved recommendations based on the user preferences. According to some embodiments, since all the data including annotations and ratings is on-chain, another participant (e.g., another servicer, user, or the like) may ingest the historical feed of content and offer their own recommendations (e.g., the same or different from servicers 310) while preserving the identity of the original content creator, content annotators, etc., using the blockchain.

Users 312 provide ratings for parent content. Users 312, acting in their own best interest (i.e., getting the best recommendations), should not seek replicated/copied content from cheaper, alternative sources because submitting ratings for nearly identical objects (which have different IDs than the original content) will result in strictly worse future recommendations. In some embodiments, copies (or nearly identical) content-addressable data may be identified using a similarity metric. The copies may be represented using fuzzy hashes comprising similar hash values. In this case, the indexer 304 may only index a first instance of a fuzzy hash for the copies.

Traditional recommender systems utilize some derivative of collaborative filtering, which provides content recommendations based on the shared overlap of preferences between users instead of using any information about the object the users vote on. Voting for copies with minute changes (which would have different IDs) is the equivalent of voting for new content to the algorithms of the recommender systems, not similar data going by a different moniker. This type of voting effectively reduces the overlap you could form with other like-minded users and makes it more difficult for the collaborative filtering algorithm analyzing a user's past activity to recommend enjoyable content. The best content discoverers would not be incentivized to continue uploading their discoveries if they weren't paid fairly for doing so.

The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

Figure 4:
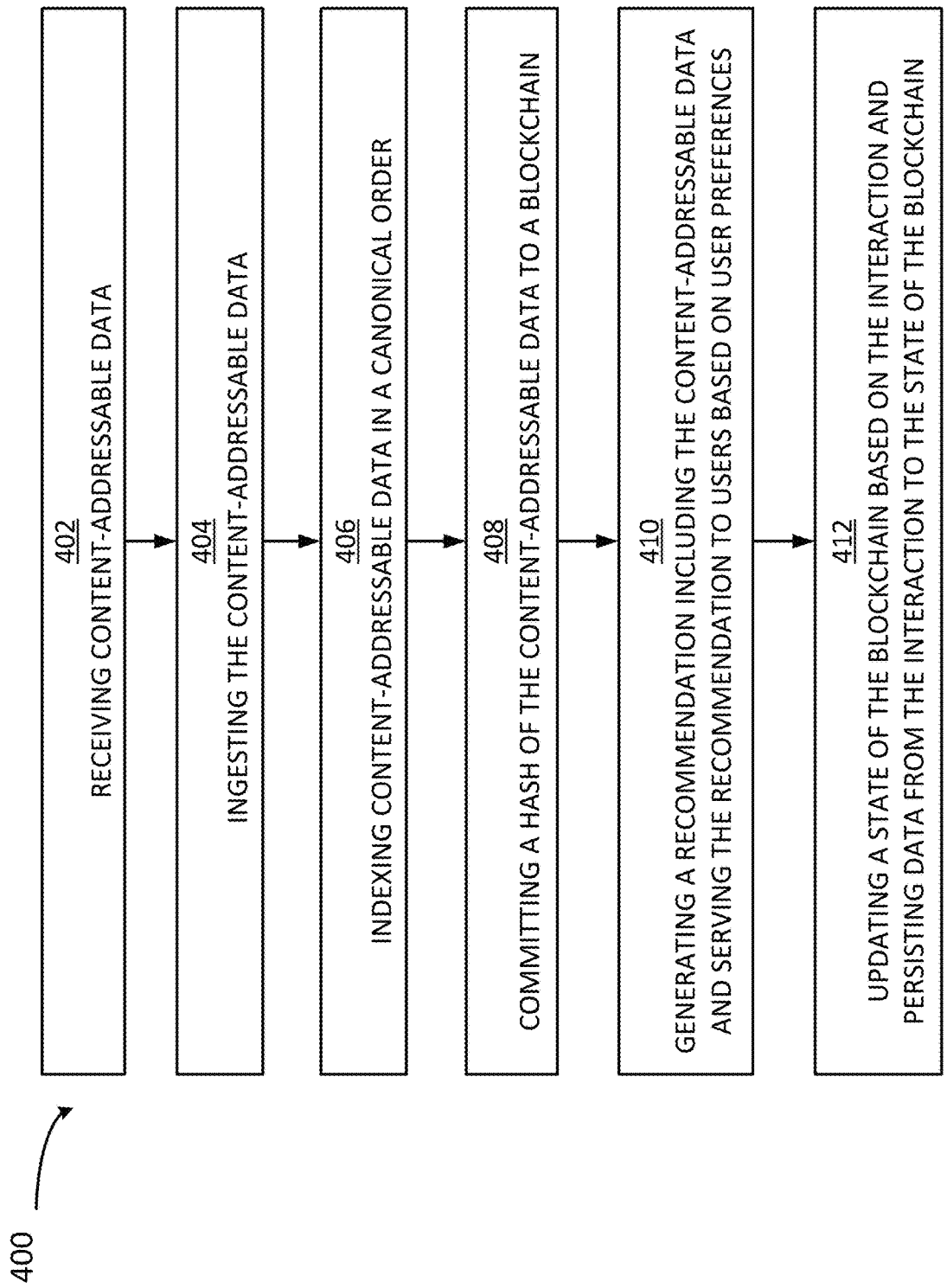
FIG. 4 is an example flow diagram for managing decentralized data in a blockchain platform, according to certain aspects of the present disclosure.

FIG. 4 illustrates an example flow diagram (e.g., process 400) for managing decentralized data in a blockchain platform, according to certain aspects of the disclosure. For explanatory purposes, the steps of the example process 400 are described herein as occurring in serial, or linearly. However, multiple instances of the example process 400 may occur in parallel, overlapping in time, almost simultaneously, or in a different order from the order illustrated in the process 400. In addition, the blocks of the example process 400 need not be performed in the order shown and/or one or more of the blocks of the example process 400 need not be performed.

At step 402, the process 400 may include receiving, blockchain platform on a blockchain platform, content-addressable data including, for example, content-addressable data. The content-addressable data may include, but is not limited to, images, videos, media content, memes, tokens, etc. The content-addressable data may correspond to metadata of the content. According to an aspect of embodiments, the content-addressable data may be collected, created, and uploaded by a participant of the blockchain platform (e.g., searchers 306) from one or more data sources (e.g., web address or the like). According to an aspect of embodiments, the participant skips uploading content where fetching their metadata takes longer than a predetermined amount of time. According to an aspect of embodiments, the participant may be rewarded for uploading the content-addressable data.

At step 404, the process 400 may include ingesting the content-addressable data. In some implementations, the content-addressable data is ingested at a VM of the blockchain platform.

At step 406, the process 400 may include indexing the content-addressable data in a canonical order. In some implementations, the content-addressable data may be indexed in the VM of the blockchain platform. According to an aspect of embodiments, only a first instance (i.e., parent) of the content-addressable data is indexed. According to an aspect of embodiments, the participant may pin any of the uploaded content that has been indexed to a locally running node. The pinned content may be deleted from the node after a certain period of time. According to an aspect of embodiments, the content-addressable data may be defined by a schema such that only content adhering to the schema may be indexed and any other content is skipped.

At step 408, the process 400 may include committing a hash corresponding to the content-addressable data to a blockchain of the blockchain platform. The hash may be assigned to the first instance of the content-addressable data and stored on-chain. In some embodiments, any copies of the content-addressable data may be assigned a fuzzy hash. Copies may be identified based on a similarity between a content and the content-addressable data being over a threshold value. According to an aspect of embodiments, the content-addressable data may be parsed and persisted on-chain.

At step 410, the process 400 may include generating a recommendation including the content-addressable data and serving the recommendation to one or more users based on user preferences. The one or more users may interact with the content-addressable data. Interactions may include, but is not limited to, ratings, annotations, and referencing of the content-addressable data. According to an aspect of embodiments, the one or more users pay a commission for interacting with the content-addressable data. The commission may be paid when logging the interaction in the blockchain. According to an aspect of embodiments, the participant who uploaded the content may receive additional royalties for the one or more users interacting with the content-addressable data. According to an aspect of embodiments, the one or more users may be rewarded when other participants reference or interact with their ratings/annotations.

At step 412, the process 400 may include updating a state of the blockchain based on the interaction and persisting data from the interaction to the state of the blockchain. According to an aspect of embodiments, the state of the blockchain is updated when processing an action on the blockchain (e.g., indexing action in step 406).

According to an aspect of embodiments, the process 400 may include determining the user preferences for generating recommendations using an AI/ML model trained on at least previous interactions corresponding to data similar to the content-addressable data and/or any interactions correspond to the one or more users.

According to an aspect of embodiments, all participants of the blockchain platform may ingest a historical feed of the content-addressable data including at least the hash, interactions, and originality data. In some embodiments, the historical feed includes the schema and/or other data corresponding to the content-addressable data.

According to an aspect of embodiments, the blockchain may include a blockchain network and/or may be a customized blockchain infrastructure (or framework).

In some implementations, one or more operation blocks of FIG. 4 may be performed by a processor circuit executing instructions stored in a memory circuit, in a client device, a remote server or a database, communicatively coupled through a network (e.g., processors 212, memories 220, participant 110, participant 130, database(s) 152, and network 150).

Although FIG. 4 shows example blocks of the process 400, in some implementations, the process 400 may include additional blocks, fewer blocks, different blocks, or differently arranged blocks than those depicted in FIG. 4.

Hardware Overview

Figure 5:
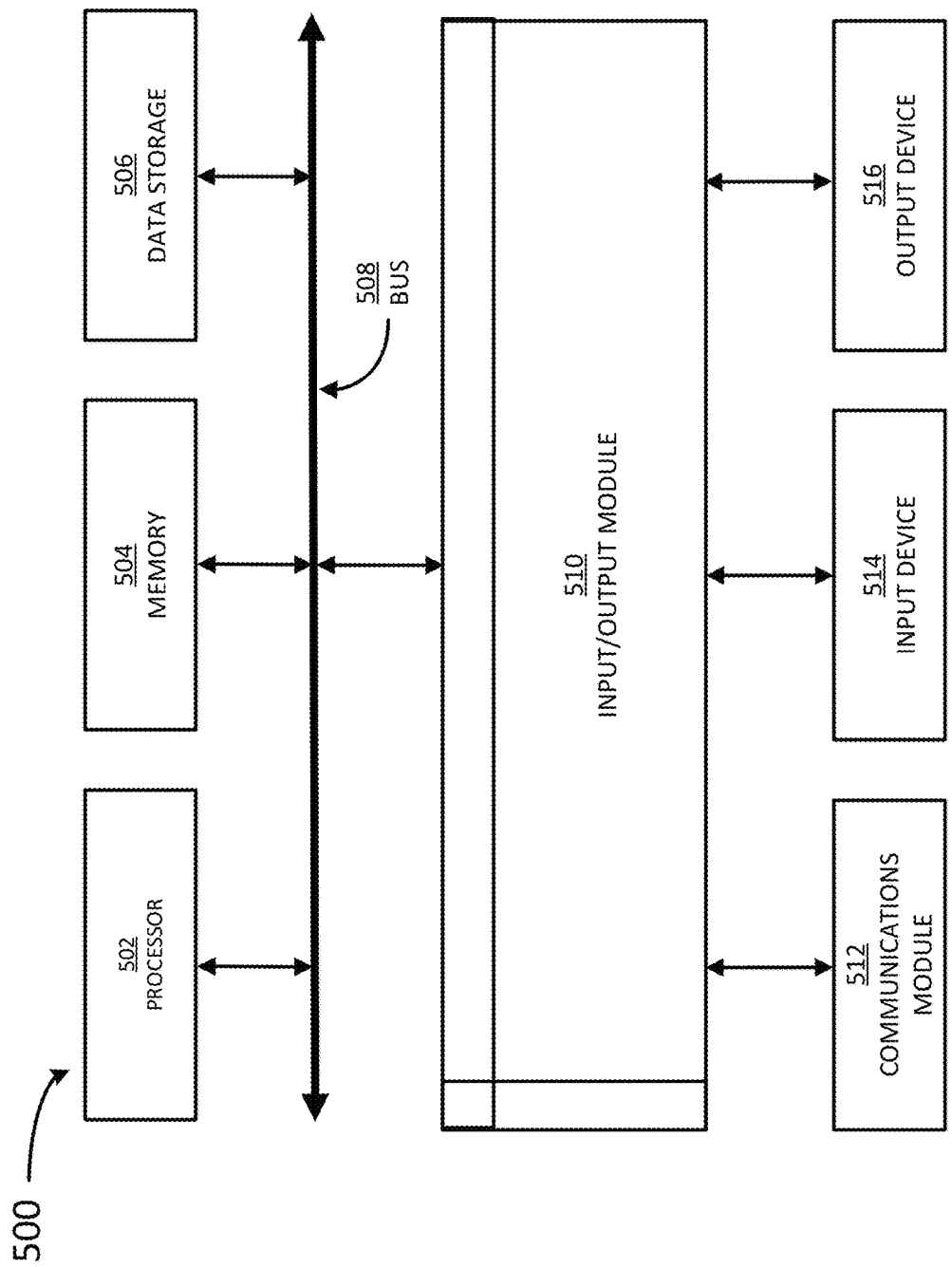
FIG. 5 is a block diagram illustrating an example computer system with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

The computer system 500 (e.g., server and/or participant) includes a bus 508 or other communication mechanism for communicating information, and a processor 502 coupled with the bus 508 for processing information. By way of example, the computer system 500 may be implemented with one or more processors 502. Each of the one or more processors 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. Processor 502 and memory 504 can be supplemented by, or incorporated in, special purpose logic circuitry.

The instructions may be stored in memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by the processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 500 further includes a data storage device 506 such as a magnetic disk or optical disk, coupled to bus 508 for storing information and instructions. The computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described systems can be implemented using a computer system 500 in response to the processor 502 executing one or more sequences of one or more instructions contained in the memory 504. Such instructions may be read into memory 504 from another machine-readable medium, such as data storage device 506. Execution of the sequences of instructions contained in the main memory 504 causes the processor 502 to perform the process steps described herein. One or more processors in a multi-processing arrangement may also be employed to execute the sequences of instructions contained in the memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 500 can include clients and servers. A client and server are generally remote from each other and typically interact through a communication network. The relationship of client and server arises by virtue of computer programs running on the respective computers and having a client-server relationship to each other. The computer system 500 can be, for example, and without limitation, a desktop computer, laptop computer, or tablet computer. The computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 502 for execution. Such a medium may take many forms, including, but not limited to, non-volatile media, volatile media, and transmission media. Non-volatile media include, for example, optical or magnetic disks, such as the data storage device 506. Volatile media include dynamic memory, such as the memory 504. Transmission media include coaxial cables, copper wire, and fiber optics, including the wires that comprise the bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method for managing content in blockchains, the method comprising:
   receiving, on a blockchain platform, content-addressable data;
   indexing the content-addressable data;
   generating a recommendation including the content-addressable data for one or more users based on user preferences;
   receiving an interaction from the one or more users based on the recommendation; and
   updating a state of a blockchain on the blockchain platform based on the interaction.

2. The computer-implemented method of claim 1, wherein the content-addressable data comprises content-addressable data including at least one of a media content item or token.

3. The computer-implemented method of claim 1, wherein the content-addressable data is uploaded to the blockchain platform by a participant of the blockchain platform, the participant receiving a reward for uploading the content-addressable data and royalties for the interaction with the content-addressable data.

4. The computer-implemented method of claim 1, further comprising ingesting the content-addressable data at a virtual machine of the blockchain platform.

5. The computer-implemented method of claim 1, further comprising:
   assigning the content-addressable data a canonical identifier including a first hash of a first instance of the content-addressable data; and
   indexing the content-addressable data in a canonical order based on the canonical identifier, wherein the first instance of the content-addressable data is indexed in a virtual machine executing the blockchain.

6. The computer-implemented method of claim 1, wherein the content-addressable data is defined by a schema and content adhering to the schema is indexed.

7. The computer-implemented method of claim 1, further comprising determining the user preferences using a machine learning (ML) model, wherein the ML model is trained on at least interactions corresponding to the one or more users.

8. The computer-implemented method of claim 1, wherein the one or more users pay a commission for interacting with the content-addressable data.

9. The computer-implemented method of claim 1, further comprising persisting data from the interaction to the state of the blockchain.

10. The computer-implemented method of claim 1, further comprising committing a hash corresponding to the content-addressable data to the blockchain on the blockchain platform, wherein content with a similarity to the content-addressable data over a threshold is assigned a fuzzy hash.

11. A system for managing content in blockchains, comprising:
   one or more processors; and
   a memory comprising instructions stored thereon, which when executed by the one or more processors, causes the one or more processors to perform:
      receiving, on a blockchain platform, content-addressable data;
      indexing the content-addressable data;
      generating a recommendation including the content-addressable data for one or more users based on user preferences;
      receiving an interaction from the one or more users based on the recommendation; and
      updating a state of a blockchain on the blockchain platform based on the interaction and persisting data from the interaction to the state of the blockchain.

12. The system of claim 11, wherein the content-addressable data includes at least one of a media content item or token.

13. The system of claim 11, wherein the content-addressable data is uploaded to the blockchain platform by a participant of the blockchain platform, the participant receiving a reward for uploading the content-addressable data and royalties for the interaction with the content-addressable data.

14. The system of claim 11, wherein the instructions, when executed by the one or more processors, cause the one or more processors to perform ingesting the content-addressable data at a virtual machine of the blockchain platform.

15. The system of claim 11, wherein the instructions, when executed by the one or more processors, cause the one or more processors to perform:
   assigning the content-addressable data a canonical identifier including a first hash of a first instance of the content-addressable data; and
   indexing the content-addressable data in a canonical order based on the canonical identifier, wherein the first instance of the content-addressable data is indexed in a virtual machine executing the blockchain.

16. The system of claim 11, wherein the content-addressable data is defined by a schema and content adhering to the schema is indexed.

17. The system of claim 11, wherein the instructions, when executed by the one or more processors, cause the one or more processors to perform determining the user preferences using a machine learning (ML) model, wherein the ML model is trained on at least interactions corresponding to the one or more users.

18. The system of claim 11, wherein the one or more users pay a commission for interacting with the content-addressable data.

19. The system of claim 11, wherein the instructions, when executed by the one or more processors, cause the one or more processors to perform committing a hash corresponding to the content-addressable data to the blockchain on the blockchain platform, wherein content with a similarity to the content-addressable data over a threshold is assigned a fuzzy hash.

20. A non-transitory computer-readable storage medium comprising instructions stored thereon, which when executed by one or more processors, cause the one or more processors to perform operations for managing content in blockchains, comprising:
   receiving, on a blockchain platform, content-addressable data;
   indexing the content-addressable data in a virtual machine of the blockchain platform;
   serving a recommendation for the content-addressable data to one or more users based on user preferences;
   receiving an interaction from the one or more users based on the recommendation; and
   updating a state of a blockchain on the blockchain platform based on the interaction and persisting data from the interaction to the state of the blockchain.

* * * * *